Nov. 21, 1967  R. F. WALKER ETAL  3,353,283

EDUCATIONAL GAME

Filed May 6, 1965

INVENTORS.

ROBERT F WALKER
JEROME L ARCHAMBAULT

United States Patent Office 3,353,283
Patented Nov. 21, 1967

3,353,283
EDUCATIONAL GAME
Robert F. Walker, Indialantic, and Jerome L. Archambault, Rockledge, Fla., assignors to Edukit, Inc., Eau Gallie, Fla.
Filed May 6, 1965, Ser. No. 453,763
7 Claims. (Cl. 35—31)

ABSTRACT OF THE DISCLOSURE

This invention is for an educational game having a rotatable cage mounted on a base and having a plurality of compartments with a cube containing numerals thereon in each compartment. Indicators are located on the base directly adjacent to the compartments of the cage and indicate the operation to be performed on that numeral displayed on the cube within its associated compartment. The cage is rotated to roll the cubes and the players perform the mathematical computation indicated by the indicators.

The present invention relates to an educational game, and more particularly to a cage used to tumble blocks or cubes marked with various symbols such as numerals, which are used in the game.

It is the prime object of the instant invention to provide a game device which uses arithmetic principles and symbols to aid in teaching children their numbers and the basic fundamentals of addition, subtraction, multiplication and division. The device further is so constructed and used to stimulate competition and the incentive to learn.

Our instant game provides the players with numerical familiarization necessary to develop speed in addition, subtraction, multiplication and division. It has unexpectedly caused the younger children using it to think without being aware of it.

More particularly, the instant invention relates to a rotatable cage which has a plurality of compartments. Into each of the compartments is inserted a cube containing numerals. The cage is further constructed so that at a point removed from but intermediate the adjacent chambers, an indicator is provided to give directions to the players as to the action to be taken with the numerals in the compartments, such as to add the numerals together. The cage is then rotated to "roll" the cubes and the player performs the mathematical computations required by the indicator.

It is a further object of the invention to provide recreation for adults.

A further object of our invention is to provide an improved mathematical game which is durable, simple in construction and cheap to manufacture.

Other objects will become apparent from the following descriptions taken in conjunction with the accompanying drawings in which the elements are similarly numbered in each of the views.

Figure 3:
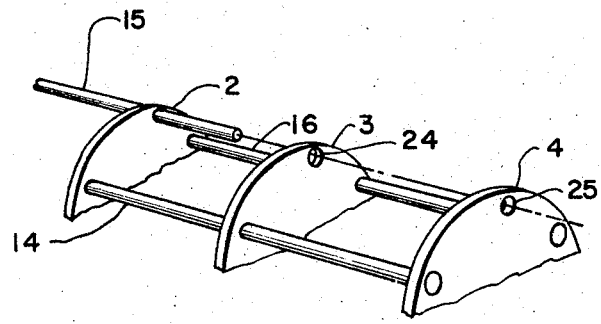
FIG. 3 is a perspective view of a portion of the preferred form of FIG. 1 where in the dowel has been partially withdrawn to allow access to the chambers.
Figure 1:
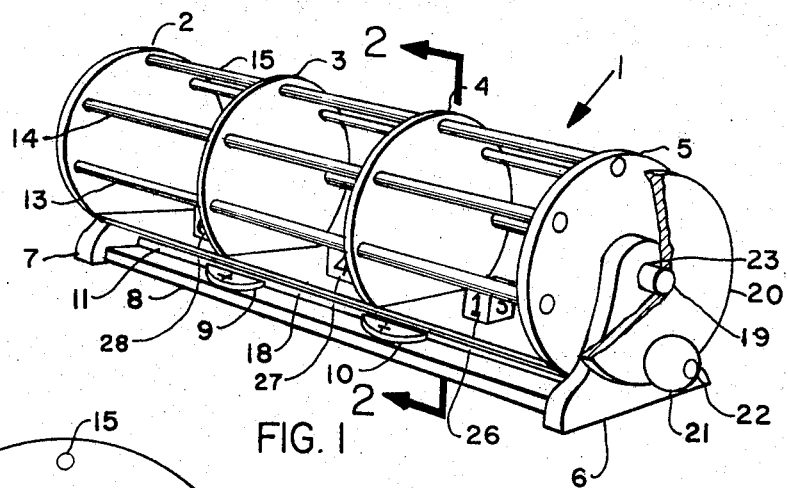
FIG. 1 is a perspective view of the preferred form of the educational game according to the present invention with a partial cut away to show hidden construction.
Figure 2:
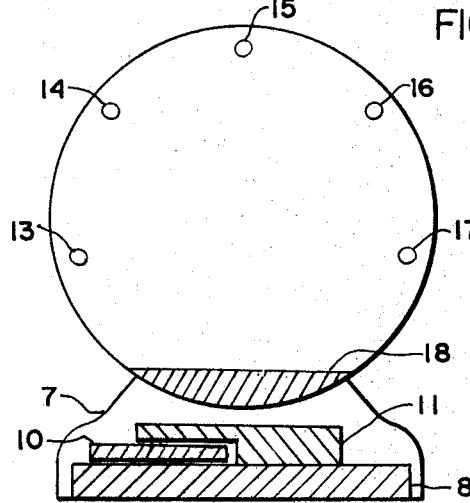
FIG. 2 is a transverse section taken along line 2—2 of FIG. 1.

Referring to the drawings in FIG. 1 the numeral 1 designates generally the preferred form of the assembled game apparatus. The rotatable cage is constructed of cage end walls 2 and 5 with inner partitions 3 and 4. The cage is rotatably mounted to support end wall 6 by journal 19, which is freely rotatable within the end wall, and to end wall 7 by a journal, not shown. Cage end walls 2 and 5 and partitions 3 and 4 are attached to a cage base plate 18 by conventional means. The cage base plate 18 is constructed so that its upper surface will function as a flat base upon which the cubes 26, 27 and 28, may fall showing only one face. The lower surface is so constructed so as to have continuity with the general shape of cage end walls 2 and 5 presenting an attractive design. The cage base plate 18 is also constructed so that it possesses enough weight so as to act as a counter weight which will always rotate to the bottom when the cage is in free swing. The sides of the rotatable cage are formed of dowels 13, 14, 15, 16 and 17. Each of the dowels 13, 14, 16 and 17 are rigidly attached through the partitions 3 and 4 and into cage end walls 2 and 5 by conventional means. As shown in FIG. 3, however, dowel 15 is not rigidly attached to the partitions 3 and 4 or the cage end walls 2 and 5, but is rather slideably mounted so as to allow the dowel 15 to be withdrawn so that the cubes used in the game may be inserted and withdrawn from each of the various compartments.

The rotatable cage is mounted to end wall 6 by journal 19 which extends through aperture 23 in end wall 6 and terminates in turning arm 20. Journal 19 is rigidly attached to turning arm 20 so that when the turning arm 20 is manually rotated the cage is turned over and over, thus scrambling the cubes in each of the compartments. Handle 21 is connected to turning arm 20 by pin 22 to which it is rotatably mounted, thus providing a convenient means to rotate the cage.

As previously described, the game is played by performing various arithmetic manipulations to the numerals which appear on the cubes 26, 27 and 28 in the compartments. These arithmetic manipulations are directed by the indicator discs 9 and 10, which are rotatably mounted to support bar 8 and cover bar 11 which is mounted above it. The indicator discs are identical and each has printed upon it the four basic arithmetic symbols, one in each quadrant of the upper surface. As shown in FIG. 1, indicator disc 9 shows an addition symbol while indicator disc 10 shows a division symbol.

Support bar 8 and cover bar 11 are attached at each end to the upright support of end walls 6 and 7. These supports act to form a rigid and stable base for the rotatable cage of a general U shape, the cage being rotatably mounted within the U.

One game which may be played with the instant game involves the use of three cubes with the numbers 1 through 6 one on each side. The cubes are inserted, one in each compartment of the cage. With the indicator disc preset the cage is rotated and allowed to come to rest. The numbers facing up are then observed with the required mathematical manipulation performed on each. The cage is passed to a second player who repeats the above steps. It can be readily seen that an object of the game is to reach a preset total score. The participants can find the game both educational and recreational. The game can be changed by replacing the cubes with others upon which higher numbers or other symbols are inscribed.

It will, of course, be understood that various details of construction may be modified without departing from the spirit of the invention herein described. It is, therefore, not our purpose to limit the patent granted hereon except as limited by the scope of the claims herein after set forth.

We claim as our invention:

1. An educational game comprised of a base member having a generally horizontal support bar with vertical end members, a cage rotatably mounted between said vertical end members, said cage being divided into compartments and having attached thereto means to manually rotate said cage, rotatably mounted indicator means attached to said horizontal support bar, cubes located in said compartments of said cage and having numerals thereupon and means to open and close said cage to allow insertion and removal of said cubes whereby each said indicator means is adjacent one said compartment of said cage and is adapted to indicate an operation to be performed with one numeral upon one said cube located in said adjacent compartment of said cage.

2. An educational game comprised of a base member having a generally horizontal support bar with vertical end members, said horizontal support bar having rotatably mounted indicator means attached thereto, a cage rotatably mounted between said vertical end members and said cage being comprised of two end walls, at least one intermediate wall located between said end walls for dividing the cage into compartments, side walls formed of a plurality of dowels which pass through each said intermediate wall and terminate in said end walls, and base plate means forming the floor of said cage, cubes located in said compartments of said cage and having numerals thereupon and means to open and close said cage to allow insertion and removal of said cubes whereby each said indicator means is adjacent one said compartment of said cage and is adapted to indicate an operation to be performed with one numeral on one said cube located in said adjacent compartment of said cage.

3. The structure of claim 2 wherein there is one intermediate wall.

4. The structure of claim 2 wherein the cage structure is substantially cylindrical.

5. The structure of claim 2 wherein the means to open and close said cage is a removable dowel.

6. The structure of claim 4 wherein one of said dowels is selectively removable and reinsertable to allow access to the compartments.

7. The structure of claim 6 wherein the indicator means consist of a substantially flat disc with indicia affixed to the surface thereof.

References Cited

UNITED STATES PATENTS

| | | | |
|---|---|---|---|
| 171,707 | 1/1876 | Walker | 273—145.3 |
| 2,186,465 | 1/1940 | Miller | 273—145.5 |
| 2,639,153 | 5/1953 | Murray | 273—145.3 |
| 2,879,066 | 3/1959 | Sutherland | 35—31 X |

FOREIGN PATENTS 636,716 5/1950 Great Britain.

EUGENE R. CAPOZIO, *Primary Examiner.*

W. GRIEB, *Assistant Examiner.*